Figure 1:
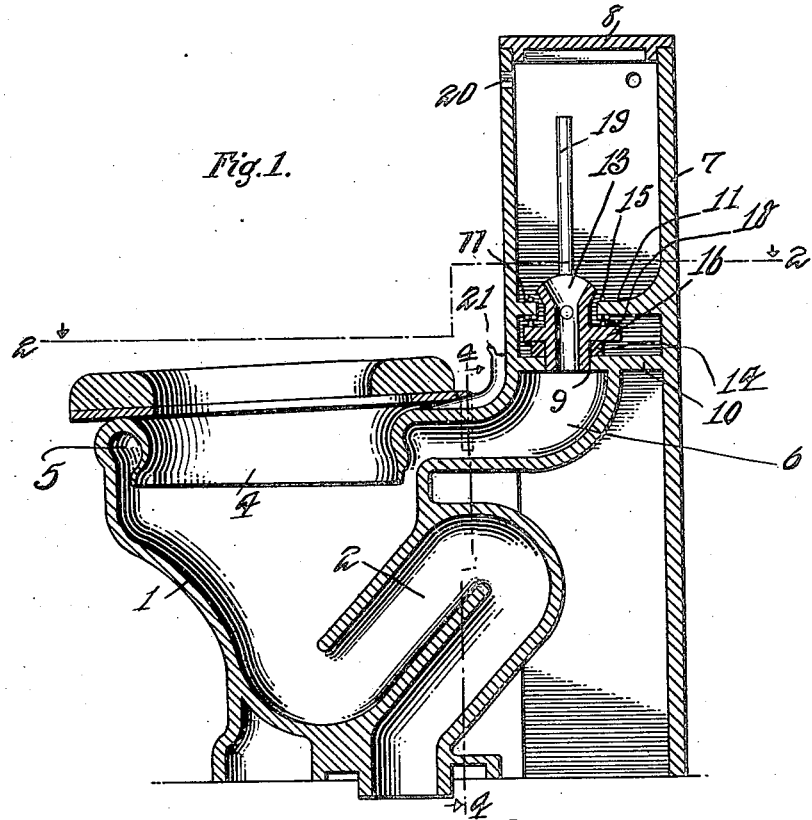

Jan. 2, 1923.
A. P. PORTER.
WATER CLOSET.
FILED JULY 29, 1922.

Witnesses
FH Taylor

Inventor
Arthur P. Porter.

By Richard B. Owen, Attorney

Jan. 2, 1923.
A. P. PORTER.
WATER CLOSET.
FILED JULY 29, 1922.
1,440,892
2 SHEETS-SHEET 2
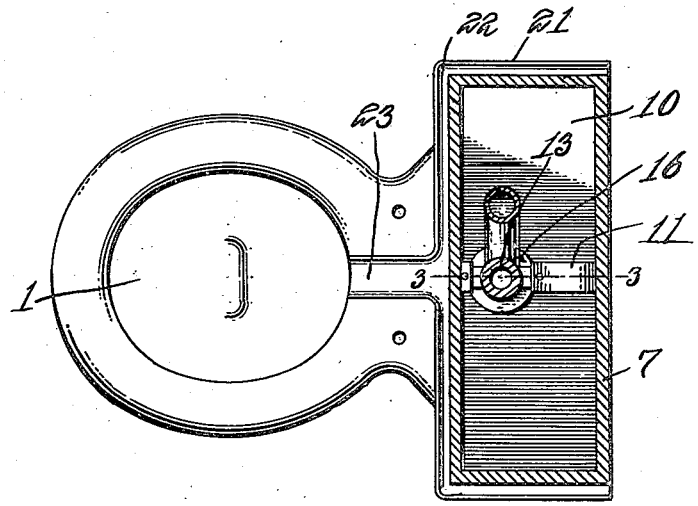
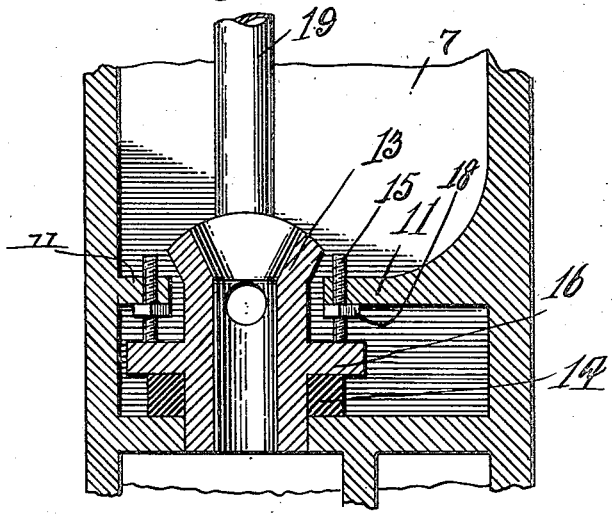
Witnesses
F. H. Taylor.
Inventor
Arthur P. Porter.
By Richard B. Owen, Attorney Patented Jan. 2, 1923.

1,440,892

UNITED STATES PATENT OFFICE.

ARTHUR P. PORTER, OF WOLFEBORO, NEW HAMPSHIRE.

WATER-CLOSET.

Application filed July 29, 1922. Serial No. 578,356.

*To all whom it may concern:*

Be it known that I, ARTHUR P. PORTER, a citizen of the United States, residing at Wolfeboro, in the county of Carroll and State of New Hampshire, have invented certain new and useful Improvements in a Water-Closet, of which the following is a specification.

The present invention relates to water closet and has for its principal object to provide a new and improved water closet arranged to combine the bowl and tank in one single integral structure, to render the water closet exceedingly sanitary, to avoid leakage, to insure an effective flushing of the bowl and the draining of accumulated moisture and overflow on the exterior of the tank.

Another important object of the invention is to provide a novel valve seat provided with means for effectively attaching the same within the tank so as to prevent leakage.

With the above and numerous other objects in view as will appear as the description progresses, the invention resides in certain novel features of construction and the combination and arrangement of parts as will be hereinafter more fully described and claimed.

In the drawing:—

Figure 4:
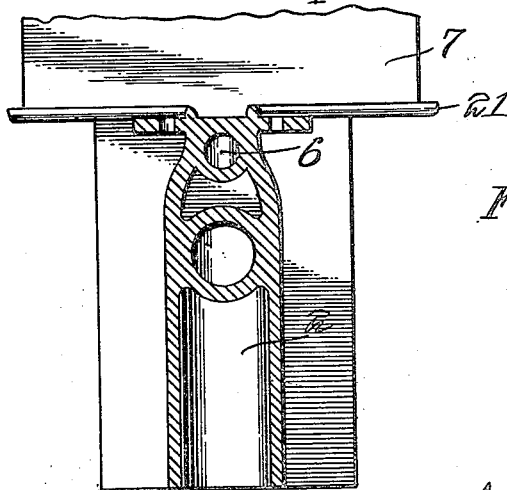

Figure 1 is a vertical section taken through the combined bowl and tank,

Figure 2 is a transverse horizontal section taken substantially on the line 2—2 of Figure 1 looking in the direction of the arrows, Figure 3 is a detailed section taken substantially on the line 3—3 of Figure 2, and Figure 4 is a detailed section taken substantially on the line 4—4 of Figure 1.

Referring to the drawing in detail it will be seen that 1 designates a closet bowl which is provided with the trap 2 and adjacent its periphery is provided with an inwardly downwardly extending flange 4 providing a passageway 5 which is communicated with the passageway 6 leading into the lower portion of the tank 7. This tank 7 is formed in one single integral structure with the bowl 1 and is provided with a removable top 8. The bottom of the tank 7 is provided with an opening 9; the bottom 10 being situated immediately above the top of the bowl 1 but of course to the rear thereof. A pair of spaced projections 11 are situated above the bottom 10 so that the interval therebetween will be in alignment with the opening 9. A valve seat 13 is situated in the opening 9 and projects above the projections 11. A washer 14 is disposed about the lower end of the valve seat 13 so as to rest upon the bottom 10. Suitable screws 15 are threaded through the projections 11 so as to bear against the member 16 and are held in locked positions by the nuts 18. The washer 14 is preferably of rubber or some such other yieldable material, while the nuts 18 are of metal or some such other non-yieldable material. Any suitable valve may be associated with the valve seat 13. An overflow pipe 19 communicates at its bottom end with the valve seat 13 intermediate its ends and extend so as to terminate a short distance from the upper end of the tank 7. The tank 7 is provided with an opening 20 which receives a flush handle. As is shown to advantage in Figures 2 and 4 the lower edge of the tank 7 upon its exterior is provided with a flange 21 having therein a suitable channel 22 which communicates with a channel 23 provided in the top of the bowl 1 leading into the interior thereof so that any moisture which may accumulate on the exterior of the tank 7 will be trapped within the channel 22 and flow by way of the channel 23 into the bowl 1.

The remaining portions of the tank and bowl may be of conventional construction and do not form part of the present invention. The structure, however, which I have shown has only been given by way of example and it is to be understood that numerous changes in the details of construction and in the combination and arrangement of parts may be resorted to without departing from the spirit of the invention as hereinafter claimed.

Having thus fully described my invention what I claim, is:—

In a water closet tank, a bottom provided with an opening, a valve seat situated in the opening, projections within the tank spaced from each other so that the space therebetween will be in registry with the opening in the bottom of the tank, a yieldable washer disposed about the valve seat so as to rest upon the bottom of the tank, a non-yieldable member disposed on the yieldable washer, and screws passing through the projections so as to bear against the non-yieldable member and forcing the yieldable washer into firm engagement with the bottom of the tank so as to prevent leakage.

In testimony whereof I affix my signature in presence of two witnesses.

ARTHUR P. PORTER.

Witnesses:
E. H. TRICKEY,
C. H. TULLEY.